US012784348B2

(12) United States Patent
Tseng et al.

(10) Patent No.: US 12,784,348 B2
(45) Date of Patent: Nov. 3, 2026

(54) INPUT OPTIMIZATION METHOD FOR MULTI-VIEW IMAGES BASED ON DEEP LEARNING MODEL FOR 3D FACE RECONSTRUCTION

(71) Applicant: A-TOP Health BIOTECH CO., LTD., Taipei (TW)

(72) Inventors: Yu Chia Tseng, Taipei (TW); Bo Wei Wu, Taipei (TW); Hsin Jou Kao, Taipei (TW)

(73) Assignee: A-TOP Health BIOTECH CO., LTD., Taipei (TW)

( * ) Notice: Subject to any disclaimer, the term of this patent is extended or adjusted under 35 U.S.C. 154(b) by 130 days.

(21) Appl. No.: 18/814,084

(22) Filed: Aug. 23, 2024

(65) Prior Publication Data

US 2025/0336148 A1 Oct. 30, 2025

(30) Foreign Application Priority Data

Apr. 26, 2024 (TW) ................................ 113115713

(51) Int. Cl.

| | |
|---|---|
| ***G06T 7/194*** | (2017.01) |
| ***G06T 3/40*** | (2006.01) |
| ***G06T 17/00*** | (2006.01) |
| ***G06V 40/16*** | (2022.01) |
| ***H04N 13/282*** | (2018.01) |

(52) U.S. Cl.

CPC ................ *G06T 17/00* (2013.01); *G06T 3/40* (2013.01); *G06T 7/194* (2017.01); *G06V 40/171* (2022.01); *H04N 13/282* (2018.05); *G06T 2207/30201* (2013.01)

(58) Field of Classification Search

CPC .......... G06T 17/00; G06T 2207/30201; G06T 7/194; H04N 13/282

USPC ......................................................... 345/419

See application file for complete search history.

(56) References Cited

U.S. PATENT DOCUMENTS

| | | | | |
|---|---|---|---|---|
| 2015/0086080 | A1 * | 3/2015 | Stein | H04N 7/183 382/104 |
| 2020/0151860 | A1 * | 5/2020 | Safdarnejad | G06V 40/175 |
| 2021/0303923 | A1 * | 9/2021 | Lee | G06V 10/82 |

(Continued)

FOREIGN PATENT DOCUMENTS

CN 115861525 A * 3/2023

OTHER PUBLICATIONS

Gong et al., Instance-level Human Parsing via Part Grouping Network, arXiv:1808.00157v1 [cs.CV] Aug. 1, 2018, p. 1-17 (Year: 2018).*

(Continued)

*Primary Examiner* — Samantha (Yuehan) Wang
(74) *Attorney, Agent, or Firm* — Clement Cheng

(57) ABSTRACT

An input optimization method for multi-view images based on deep learning model for 3D face reconstruction is disclosed. The method first removes background from the modeling images containing a face, and then groups these modeling images without background into left face images, front face images and right face images, and marks several facial landmarks on them. From these left face images and right face images, the ones with smaller differences between the new facial landmark positions after homography transformation and facial landmark positions of the front face images are selected and used for 3D face reconstruction.

6 Claims, 3 Drawing Sheets

(56) References Cited

U.S. PATENT DOCUMENTS

| | | | | |
|---|---|---|---|---|
| 2022/0005266 | A1* | 1/2022 | Glazistov | G06T 17/00 |
| 2023/0031750 | A1* | 2/2023 | Li | G06T 17/20 |

OTHER PUBLICATIONS

Cole et al., Synthesizing Normalized Faces from Facial Identity Features, arXiv:1701.04851v4 [cs.CV] Oct. 17, 2017, p. 1-14 (Year: 2017).*

Xu et al., Face 2D to 3 D Reconstruction Network Based on Head Pose and 3 D Facial Landmarks, 2021 International Conference on Visual Communications and Image Processing (VCIP) (Year: 2021).*

* cited by examiner receiving a plurality of modeling images including a face obtained around a head (S01)

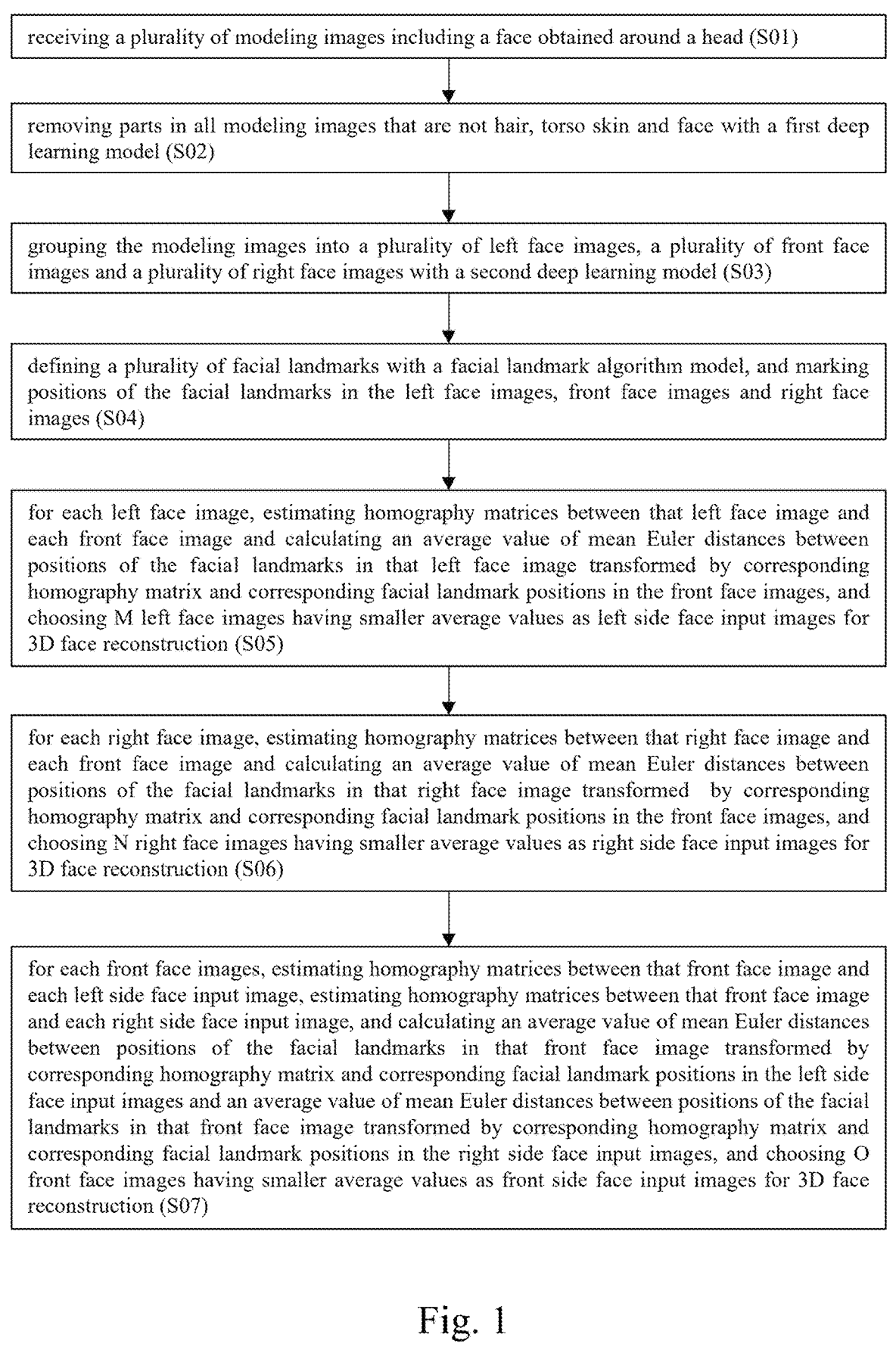

↓ removing parts in all modeling images that are not hair, torso skin and face with a first deep learning model (S02)

↓ grouping the modeling images into a plurality of left face images, a plurality of front face images and a plurality of right face images with a second deep learning model (S03)

↓ defining a plurality of facial landmarks with a facial landmark algorithm model, and marking positions of the facial landmarks in the left face images, front face images and right face images (S04)

↓ for each left face image, estimating homography matrices between that left face image and each front face image and calculating an average value of mean Euler distances between positions of the facial landmarks in that left face image transformed by corresponding homography matrix and corresponding facial landmark positions in the front face images, and choosing M left face images having smaller average values as left side face input images for 3D face reconstruction (S05)

↓ for each right face image, estimating homography matrices between that right face image and each front face image and calculating an average value of mean Euler distances between positions of the facial landmarks in that right face image transformed by corresponding homography matrix and corresponding facial landmark positions in the front face images, and choosing N right face images having smaller average values as right side face input images for 3D face reconstruction (S06)

↓ for each front face images, estimating homography matrices between that front face image and each left side face input image, estimating homography matrices between that front face image and each right side face input image, and calculating an average value of mean Euler distances between positions of the facial landmarks in that front face image transformed by corresponding homography matrix and corresponding facial landmark positions in the left side face input images and an average value of mean Euler distances between positions of the facial landmarks in that front face image transformed by corresponding homography matrix and corresponding facial landmark positions in the right side face input images, and choosing O front face images having smaller average values as front side face input images for 3D face reconstruction (S07)

Fig. 1

INPUT OPTIMIZATION METHOD FOR MULTI-VIEW IMAGES BASED ON DEEP LEARNING MODEL FOR 3D FACE RECONSTRUCTION

FIELD OF THE INVENTION

The present invention relates to an input optimization method. More particularly, the present invention relates to an input optimization method for multi-view images based on deep learning model for 3D face reconstruction.

BACKGROUND OF THE INVENTION

Human beings live in a three-dimensional space. In addition to paper, the supplies they use are all three-dimensional. Traditionally, when making these supplies or their housings, molds are needed to shape the materials, and making the aforementioned molds requires complicated manual or machine cutting. With the advancement of 3D printing technology, the production of molds can be omitted from the production process. Although molds are no longer needed, in order for the printing material to be finalized at a set position in space, the three-dimensional appearance of the object must be presented as a 3D image or 3D modeling file.

3D face reconstruction is an application of 3D printing. In addition to copying the human face including the head through a 3D printing machine, 3D face reconstruction files can also be used in many aspects, such as plastic surgery, identity recognition, etc. In addition to the high-cost method of producing 3D face reconstruction models by directly scanning the entire face with reflected light, obtaining 3D face reconstruction models from 2D panoramic images based on computer vision technology is a commonly used method in the industry. It generally includes several steps: 1. obtaining images of multiple faces from different perspectives; 2. extracting features (positions) from these images; 3. matching the images; 4. restoring a 3D structure of the face by structure from motion technology; 5. processing depth map estimation; 6. obtaining a dense mesh structure for reconstructing the face; and 7. constructing detailed texture of the face, and then a 3D face reconstruction mesh structure (3D modeling file) can be obtained.

In order to obtain an accurate 3D face reconstruction mesh structure, engineers will try to obtain as many face images from different perspectives as possible during production. When inputting too many face images into the models for estimation and processing, in addition to increasing resource consumption, experiments have found that too many input images or closely continuous viewing angles often introduce noise and ambiguity, resulting in poor reconstruction results. However, since it is difficult to manually select reliable images based on intuition, determining which images should be retained and how many viewing angles becomes a challenging task. This is the problem that the present invention aims to solve.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

An input optimization method for multi-view images based on deep learning model for 3D face reconstruction is disclosed in the present invention. The method is executed through a computer and comprises steps of: a) receiving a plurality of modeling images including faces obtained around a head; b) removing parts in all modeling images that are not hair, torso skin and face with a first deep learning model; c) grouping the modeling images into a plurality of left face images, a plurality of front face images and a plurality of right face images with a second deep learning model; d) defining a plurality of facial landmarks with a facial landmark algorithm model, and marking positions of the facial landmarks in the left face images, front face images and right face images; e) for each left face image, estimating homography matrices between that left face image and each front face image and calculating an average value of mean Euler distances between positions of the facial landmarks in that left face image transformed by corresponding homography matrix and corresponding facial landmark positions in the front face images, and choosing M left face images having smaller average values as left side face input images for 3D face reconstruction; f) for each right face image, estimating homography matrices between that right face image and each front face image and calculating an average value of mean Euler distances between positions of the facial landmarks in that right face image transformed by corresponding homography matrix and corresponding facial landmark positions in the front face images, and choosing N right face images having smaller average values as right side face input images for 3D face reconstruction; and g) for each front face images, estimating homography matrices between that front face image and each left side face input image, estimating homography matrices between that front face image and each right side face input image, and calculating an average value of mean Euler distances between positions of the facial landmarks in that front face image transformed by corresponding homography matrix and corresponding facial landmark positions in the left side face input images and an average value of mean Euler distances between positions of the facial landmarks in that front face image transformed by corresponding homography matrix and corresponding facial landmark positions in the right side face input images, and choosing O front face images having smaller average values as front side face input images for 3D face reconstruction. M, N and O are natural numbers. M is less than a number of the left face images. N is less than a number of the right face images. O is less than a number of the front face images.

According to the present invention, the modeling images are images taken from different angles or extracted from a video recorded around the head.

According to the present invention, the first deep learning model is Part Grouping Network (PGN) model.

Each modeling image is processed according to the following steps: scaling the modeling image to a computing image with a specific resolution; inputting the computing image to the PGN model to obtain a background image with the same resolution, wherein the background image forms a mask; restoring the resolution of the background image to the same resolution as the modeling images; and setting pixels of the modeling image corresponding to that in the mask of the restored background image as background and removing them.

According to the present invention, the facial landmark algorithm model is Dlib model and a number of defined facial landmarks is 68.

The second deep learning model is built by: extracting features from a number of training facial images by Convolutional Neural Network (CNN) algorithm and describing the extracted features with vectors; reducing dimensionality of the vectors by Principal Components Analysis (PCA) algorithm; and dividing the vectors with reduced dimensionality into three groups by K-means algorithm, representing left side face, right side face and front face, respectively.

Preferably, in step a), the head is further covered with a hairnet, and in step b), the first deep learning model retains the part of the hairnet without removing it.

The present invention first removes background from the modeling images containing a face, and then groups these modeling images without background into left face images, front face images and right face images, and marks several facial landmarks on them. From these left face images and right face images, the ones with smaller differences between the new facial landmark positions after homography transformation and facial landmark positions of the front face images are selected for use in the 3D face reconstruction model. For the facial landmark positions of the frontal face images, the above-mentioned homography transformation is performed with the left side face input images and the right side face input images at the same time, and several smaller differences between new facial landmark positions after transformation and the left face images or the right face images facial landmark positions are selected for 3D face reconstruction models. In this way, the selected left face images, front face images and right face images have better correlation with each other, which can prevent image noise from interfering with the reconstruction for 3D face models and also reduce the consumption of computer resources during operation.

BRIEF DESCRIPTION OF THE DRAWINGS

FIG. 1 is a flow chart of an input optimization method for multi-view images based on deep learning model for 3D face reconstruction according to an embodiment of the present invention.

DETAILED DESCRIPTION OF THE PREFERRED EMBODIMENTS

The present invention will now be described more specifically with reference to the following embodiments.

See FIG. 1. It is a flow chart of an input optimization method for multi-view images based on deep learning model for 3D face reconstruction (hereinafter referred to as the method) according to an embodiment of the present invention. The method is executed through a computer; specifically, implemented by the computer performing special calculations on the numerical values of the images. In the aforementioned method of obtaining 3D face reconstruction models from 2D panoramic images, the method can be applied between steps 1 and 2 to select appropriate images while reducing the number of input images from different perspectives of the face. The method contains 7 steps, which are detailed below.

Figure 2:
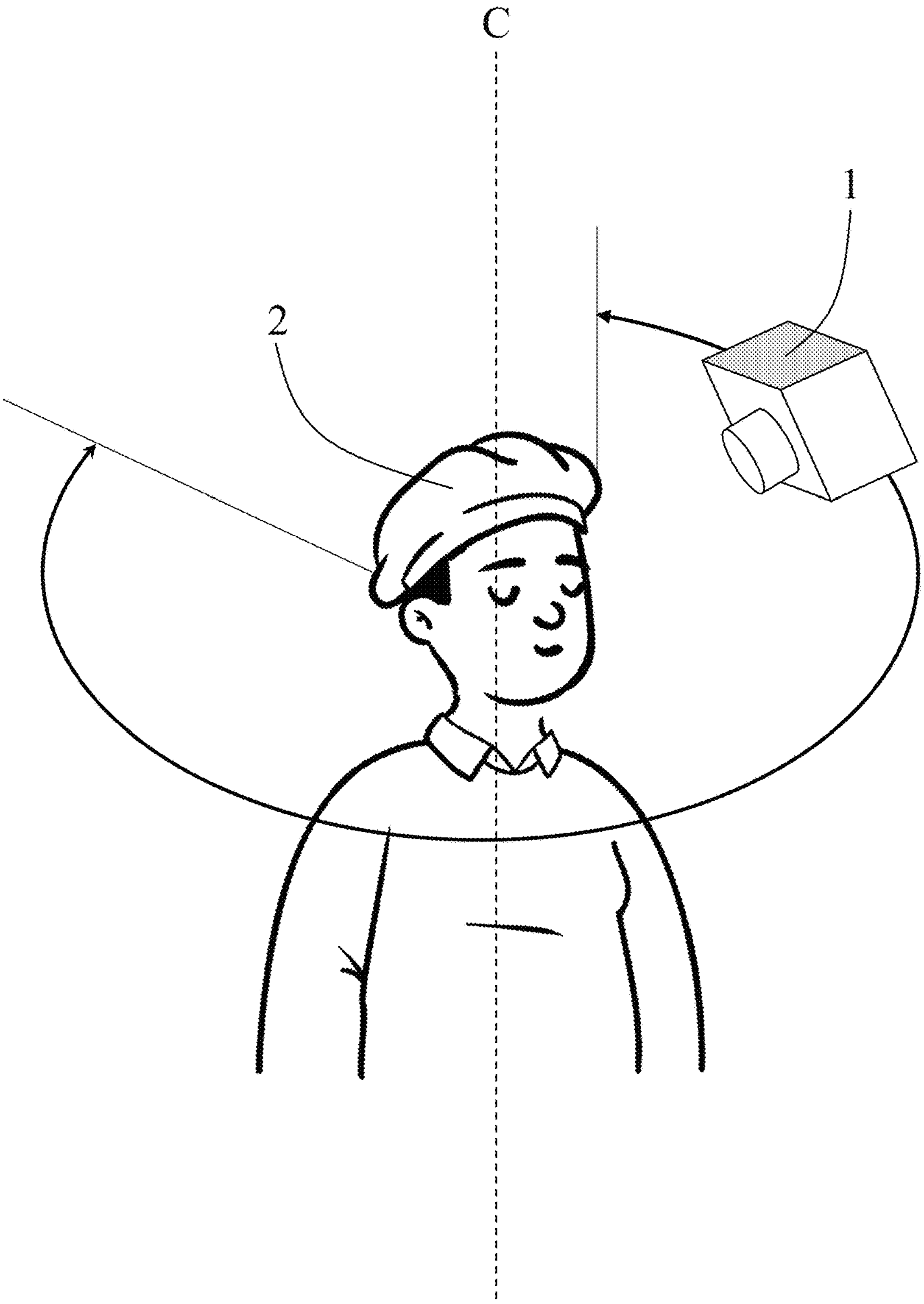
FIG. 2 is a schematic diagram of using a camera to obtain modeling images surrounding a head including a face.

A first step of the method is receiving a plurality of modeling images including faces obtained around a head (S01). See FIG. 2. It is a schematic diagram of using a camera 1 to obtain modeling images surrounding a head including a face. Suppose there is a central axis C passing through the head and a neck of the person to be imaged. A sum of the distances between the central axis C and all parts of the face is the smallest. The camera 1 is on a plane perpendicular to the central axis C, and performs photography operations facing the central axis C with a fixed radius around the central axis C. In practice, the theoretical central axis C does not exist. The camera 1 only needs to revolve around a set axis as much as possible to capture videos or take pictures around the person's head, and the latter is preferably taken at a certain frequency. The modeling images can be extracted from different perspectives (timing) recorded in the video, or they can be frame-by-frame photos taken at different angles. Since the modeling images must include the face, the images obtained between the double arrow arcs in FIG. 2 are the modeling images that can be used. Camera 1 cannot obtain images of the face outside this range. In order to reduce the noise in processing modeling images in subsequent steps, it is best to wear a hairnet 2 as shown in FIG. 2 on the head of the person to be imaged. It is also best for the person to keep his eyes closed and the facial expression consistent.

A second step of the method is removing parts in all modeling images that are not hair, torso skin and face with a first deep learning model (S02). This step is to perform a background removal operation, leaving only the appearance of the person above the neck, and removing as much clothing as possible. Although there are many deep learning models in the existing technology that can be used to achieve the above purpose, considering the need to distinguish hair, torso skin and face as much as possible in the modeling images, the first deep learning model is a Part Grouping Network (PGN) model. However, although each modeling image may obtain the aforementioned partial appearance including the face, the resolution of the modeling images processed by the PGN model will change and the overall image will be deformed, so it cannot be used in subsequent steps. To this end, the present invention proposes a solution.

Figure 3:
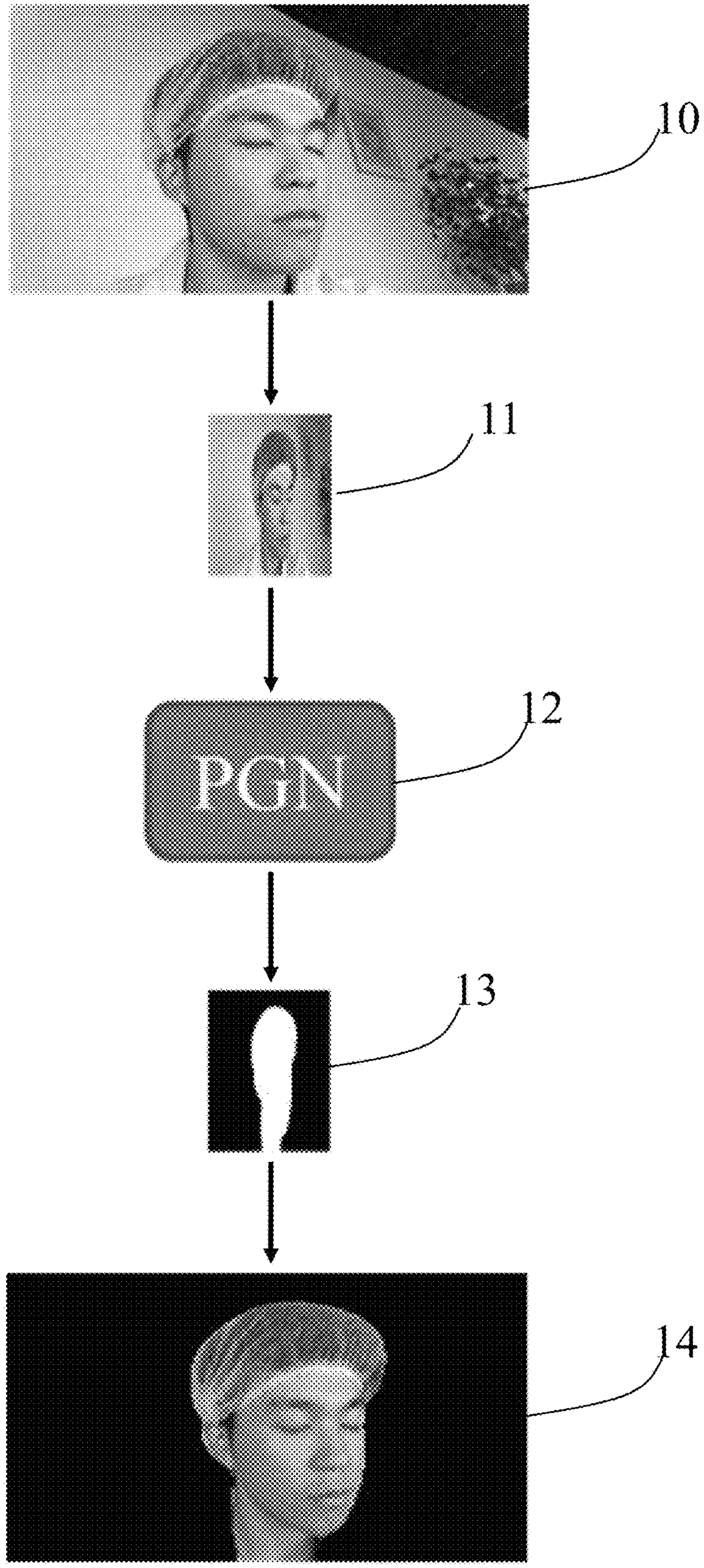
FIG. 3 shows various aspects of a modeling image after different processing.

For a detailed explanation of the aforementioned solution, please also refer to FIG. 3. It shows various aspects of a modeling image 10 after different processing. Step 1 of the solution is scaling the modeling image 10 to a computing image 11 with a specific resolution. In the example of FIG. 3, the modeling image 10 comes from the camera 1, therefore, it has 3,840*2,160 pixels set by the camera 1. Since the resolution of the input image accepted by the PGN model 12 is 256*192 pixels, which is much smaller than the resolution set by camera 1, 256*192 pixels is set as the specific resolution mentioned above. The modeling image 10 is compressed by a computer to form the computing image 11 with a resolution of 256*192 pixels. On the contrary, if the resolution set by camera 1 is smaller than the resolution of the input image accepted by PGN model 12, then the modeling image 10 must be appropriately enlarged. The present invention does not limit the rescaling algorithms used for image compression or enlargement. Although FIG. 3 shows that computing image 11 is deformed, the impact of the deformation will be offset in subsequent steps. The above resolution are only examples and are not intended to limit the present invention.

Then, step 2 is inputting the computing image 11 to the PGN model 12 to obtain a background image 13 of the same size, wherein a mask is formed in the background image 13. Step 2 does not use the foreground (hair, torso skin and face) parts extracted by the PGN model 12 but makes the background into the mask. In FIG. 3, the foreground part is represented in white (actually transparent), and the mask in the background is represented in black. The background image 13 and the computing image 11 have the same resolution.

Step 3 of the solution is restoring the resolution of the background image 13 to the same resolution as the modeling image 10. Namely, enlarge the resolution of background image 13 from 256*192 pixels back to 3,840*2,160 pixels. Algorithms used for image compression and enlargement need to be the same but only the processing concept is opposite to avoid the mask being disproportionately deformed after the background image 13 is enlarged (or compressed in other examples).

Finally, step 4 is setting pixels of the modeling image 10 corresponding to that in the mask of the restored background image 13 as background and removing them to form a background-free modeling image 14. In short, step 4 is equivalent to overlaying the restored background image 13 on the modeling image 10, and letting the mask cover the background of the modeling image 10 to show the hair, torso skin and face parts. In this way, the PGN model 12 can be used to perform the background removal operation without affecting the wholeness of the modeling image 10. It should be noted that the first deep learning model may be set to retain the part of the hairnet 2 without removing it. This helps reduce misjudgments in hair processing in subsequent steps of the method.

A third step of the method is grouping the modeling images into a plurality of left face images, a plurality of front face images and a plurality of right face images with a second deep learning model (S03). Since the subsequent processing steps of the present invention need to distinguish left side face, right side face and front face, this step is regarded as a pre-processing step. There should be only one true "front face image", which is the image obtained by shooting the face with camera 1 "perpendicularly in the center". Any face image taken from the left to this true front face image belongs to a left face image, and any face image taken from the right to this true front face image belongs to a right face image. However, subsequent processing steps require a certain number of "front face images". The simplest way is to divide the left face images and right face images that are close to the "frontal" part of the shot into the front face images. For example, the face images within 10 degrees on both sides of the "front" are set as the front face images. Although this approximately objective division method is simple, it is heuristic and difficult to determine the aforementioned 10-degree range. In addition, the purpose of distinguishing left side face, right side face and front face is to find facial landmarks required for calculation in the background-removed modeling images. Some people's faces may have too protruding noses or too deep eye sockets, which affects the accuracy of facial landmarks, so they need to use fewer front face images. The aforementioned algorithm based on angle estimation and further grouping is not suitable. Therefore, the present invention proposes the aforementioned second deep learning model to group the background-removed modeling images.

According to the present invention, the second deep learning model is built by the following way. In a first stage, extract features from a number of training facial images by Convolutional Neural Network (CNN) algorithm and describe the extracted features with vectors. In this stage, use of CNN algorithm can find special parts in facial images, such as the corners of the eyes, the tip of the nose, and the tip of the eyebrows. The location and characteristic of these special facial parts can be expressed with multiple vector components. The number of vector components may vary depending on the architecture of the CNN algorithm, but the number is usually large. Hence, a second stage reduces dimensionality of the vectors by Principal Components Analysis (PCA) algorithm. For example, reduce the dimensions of a 256-dimensional vector to 86 dimensions. Finally, a third stage divides the vectors with reduced dimensionality into three groups by K-means algorithm, representing left side face, right side face and front face, respectively. When using the second deep learning model, as long as the background-removed modeling images are input, the best grouping boundary found by the K-means algorithm can classify each of the background-removed modeling images as the left face image, the front face images or the right face image.

A fourth step of the method is defining a plurality of facial landmarks with a facial landmark algorithm model and marking positions of the facial landmarks in the left face images, front face images and right face images (S04). According to the present invention, the facial landmark algorithm model used is Dlib model. In the embodiment, the number of facial landmarks defined by the Dlib model is 68. The facial landmarks are left face boundary point, right face boundary point, left eyebrow center, right eyebrow center, chin boundary point, etc. The front face images should contain all the aforementioned facial landmarks, the left face images should contain 39 facial landmarks that belong to the left side of the face, and the right face images should contain 39 facial landmarks that belong to the right side of the face.

A fifth step of the method is for each left face image, estimating homography matrices between that left face image and each front face image and calculating an average value of mean Euler distances between positions of the facial landmarks in that left face image transformed by corresponding homography matrix and corresponding facial landmark positions in the front face images, and choosing M left face images having smaller average values as left side face input images for 3D face reconstruction (S05). Homography is a concept in projective geometry, also known as projective transformation. It maps points (three-dimensional homogeneous vectors) on one projective plane to another projective plane, and maps straight lines into straight lines, which has line-preserving property. Namely, homography is a linear transformation of three-dimensional homogeneous vectors, and a homography matrix can be used to represent the transformation relationship. Assume that after the fourth step, 15 left face images (L1, L2, . . . , and L15), 16 right face images (R1, R2, . . . , and L16) and 14 front face images (F1, F2, . . . , and F14) are obtained. For the left face image L1, the position coordinates of the 39 facial landmarks on it in the original image are (L1x1, L1y1), (L1x2, L1y2), . . . , and (L1x39, L1y39). The facial landmark positions the front face image F1 corresponding to are (F1x1, F1y1), (F1x2, F1y2), . . . , and (F1x39, F1y39), the facial landmark positions the front face image F2 corresponding to are (F2x1, F2y1), (F2x2, F2y2), . . . , and (F2x39, F2y39), . . . , and the facial landmark positions the front face image F14 corresponding to are (F14x1, F14y1), (F14x2, F14y2) . . . (F14x39, F14y39). Take the left face image L1 as an example. New positions of the facial landmarks of the left face image L1 after transformation with the homography matrix between itself and the front face image F1 are (LF1x1, LF1y1), (LF1x2, LF1y2), . . . , and (LF1x39, LF1y39). Euler distances between positions of the facial landmarks in the transformed left face image L1 and corresponding facial landmark positions in the front face image F1 are $[(LF1x1-F1x1)^2+(LF1y1-F1y1)^2]^{0.5}$, $[(LF1x2-F1x2)^2+(LF1y2-F1y2)^2]^{0.5}$, . . . , and $[(LF1x39-F1x39)^2+(LF1y39-F1y39)^2]^{0.5}$, respectively. The mean Euler distance is the average of the aforementioned 39 calculated values. Similarly, the left face image L1 can be successively calculated 13 average Euler distances with another 13 front face images according to the above calculation method. An average value of mean Euler distances is obtained by summing 14 average Euler distances and dividing by 14. M is a natural number and less than a number of the left face images. In this embodiment, M=5. After sorting and comparison, 5 left face images with smaller average values (such as L1, L6, L8, L11 and L15) are chosen as the left side face input images for 3D face reconstruction.

A sixth step of the method is for each right face image, estimating homography matrices between that right face image and each front face image and calculating an average value of mean Euler distances between positions of the facial landmarks in that right face image transformed by corresponding homography matrix and corresponding facial landmark positions in the front face images, and choosing N right face images having smaller average values as right side face input images for 3D face reconstruction (S06). This step is similar to the fifth step, except that the application target is different. The following example is used to illustrate. For the right face image R1, the position coordinates of the 39 facial landmarks on it in the original image are (R1x1, R1y1), (R1x2, R1y2), . . . , and (R1x39, R1y39). The facial landmark positions the front face image F1 corresponding to are (F1x1', F1y1'), (F1x2', F1y2'), . . . , and (F1x39', F1y39'), the facial landmark positions front face image F2 corresponding to are (F2x1', F2y1'), (F2x2', F2y2') . . . (F2x39', F2y39'), . . . , and facial landmark positions the front face images F14 corresponding to are (F14x1', F14y1'), (F14x2', F14y2'), . . . , and (F14x39', F14y39'). Take the right face image R1 as an example. New positions of the facial landmarks of the right face image R1 after conversion with the homography matrix between itself and the front face image F1 are (RF1x1, RF1y1), (RF1x2, RF1y2), . . . , and (RF1x39, RF1y39). Euler distances between positions of the facial landmarks in the transformed right face image R1 and corresponding facial landmark positions in the front face image F1 are $[(RF1x1-F1x1')^2+(RF1y1-F1y1')^2]^{0.5}$, $[(RF1x2-F1x2')^2+(RF1y2-F1y2')^2]^{0.5}$, . . . , and $[(RF1x39-F1x39')^2+(RF1y39-F1y39')^2]^{0.5}$, respectively. The mean Euler distance is the average of the aforementioned 39 calculated values. Similarly, right face image R1 can be successively calculated 13 average Euler distances with another 13 front face images according to the above calculation method. Here, calculation of the average value of mean Euler distances is the same as what disclosed above. It is obtained by summing the 14 average Euler distances and dividing by 14. N is a natural number and less than a number of the right face images. In this embodiment, N=5. After sorting and comparison, 5 right face images with smaller average values (such as R2, R5, R8, R12 and R13) are chosen as the right side face input images for 3D face reconstruction.

A seventh step of the method is for each front face images, estimating homography matrices between that front face image and each left side face input image, estimating homography matrices between that front face image and each right side face input image, and calculating an average value of mean Euler distances between positions of the facial landmarks in that front face image transformed by corresponding homography matrix and corresponding facial landmark positions in the left side face input images and an average value of mean Euler distances between positions of the facial landmarks in that front face image transformed by corresponding homography matrix and corresponding facial landmark positions in the right side face input images, and choosing O front face images having smaller average values as front side face input images for 3D face reconstruction (S07). Comparing to the selection method of the left side face input images and the right side face input images, the selection method of the front face input image is different. First, reversely calculate homography matrices between the front face images to the left side face input images selected in step S05 (such as L1, L6, L8, L11 and L15), and between the front face images to the right side face input images selected in step S06 (such as R2, R5, R8, R12 and R13). Take the front face image F1 as an example. New positions of the facial landmarks of the front face image F1 after transformation with the homography matrix between itself and the left side face input image L1 are (FL1x1, FL1y1), (FL1x2, FL1y2), . . . , and (FL1x39, FL1y39). Euler distances between positions of the facial landmarks in the transformed front face image F1 and corresponding facial landmark positions in the left side face input image L1 are $[(FL1x1-(L1x1)^2+(FL1y1-(L1y1)^2]^{0.5}$, $[FL1x2-(L1x2)^2+(FL1y2-(L1y2)^2]^{0.5}$, . . . , and $[FL1x39-(L1x39)^2+(FL1y39-(L1y39)^2]^{0.5}$, respectively. The front face image F1 can be successively calculated 4 average Euler distances with another 4 left side face input images according to the above calculation method. An average value of mean Euler distances is obtained by summing 5 average Euler distances and dividing by 5. Identically, each front face image can also be calculated in the same way to obtain 5 mean Euler distances between itself and the 5 right side face input images, and then the average value of the mean Euler distances regarding the right side face input images can be obtained. Accordingly, each front face image is calculated to obtain two average values of the mean Euler distances. According to the present invention, O is a natural number and less than a number of the front face images. In this embodiment, O is set to 4. Sort all 28 average values of the mean Euler distances and find the first 4 smaller values. The corresponding front face images (such as F1, F2, F7 and F10) are the front face input images used for 3D face reconstruction. If any two of these average values come from the same front face images, then select the front face image corresponding to the fifth smaller average value of the mean Euler distances as the front face input image for 3D face reconstruction.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An input optimization method for multi-view images based on deep learning model for 3D face reconstruction, executed through a computer, comprising steps of:

a) receiving a plurality of modeling images including a face obtained around a head;

b) removing parts in all modeling images that are not hair, torso skin and face with a first deep learning model;

c) grouping the modeling images into a plurality of left face images, a plurality of front face images and a plurality of right face images with a second deep learning model;

d) defining a plurality of facial landmarks with a facial landmark algorithm model, and marking positions of the facial landmarks in the left face images, front face images and right face images;

e) for each left face image, estimating homography matrices between that left face image and each front face image and calculating an average value of mean Euler distances between positions of the facial landmarks in that left face image transformed by corresponding homography matrix and corresponding facial landmark positions in the front face images, and choosing M left face images having smaller average values as left side face input images for 3D face reconstruction;

f) for each right face image, estimating homography matrices between that right face image and each front face image and calculating an average value of mean Euler distances between positions of the facial landmarks in that right face image transformed by corresponding homography matrix and corresponding facial landmark positions in the front face images, and choosing N right face images having smaller average values as right side face input images for 3D face reconstruction; and g) for each front face images, estimating homography matrices between that front face image and each left side face input image, estimating homography matrices between that front face image and each right side face input image, and calculating an average value of mean Euler distances between positions of the facial landmarks in that front face image transformed by corresponding homography matrix and corresponding facial landmark positions in the left side face input images and an average value of mean Euler distances between positions of the facial landmarks in that front face image transformed by corresponding homography matrix and corresponding facial landmark positions in the right side face input images, and choosing O front face images having smaller average values as front side face input images for 3D face reconstruction, wherein M, N and O are natural numbers, M is less than a number of the left face images, N is less than a number of the right face images, and O is less than a number of the front face images, wherein the second deep learning model is built by: extracting features from a number of training facial images by Convolutional Neural Network (CNN) algorithm and describing the extracted features with vectors; reducing dimensionality of the vectors by Principal Components Analysis (PCA) algorithm; and dividing the vectors with reduced dimensionality into three groups by K-means algorithm, representing left side face, right side face and front face, respectively.

2. The input optimization method for multi-view images based on deep learning model for 3D face reconstruction according to claim 1, wherein the modeling images are images taken from different angles or extracted from a video recorded around the head.

3. The input optimization method for multi-view images based on deep learning model for 3D face reconstruction according to claim 1, wherein the first deep learning model is Part Grouping Network (PGN) model.

4. The input optimization method for multi-view images based on deep learning model for 3D face reconstruction according to claim 3, wherein each modeling image is processed according to the following steps:

scaling the modeling image to a computing image with a specific resolution;

inputting the computing image to the PGN model to obtain a background image of the same size, wherein a mask is formed in the background image;

restoring the resolution of the background image to the same resolution as the modeling images; and setting pixels of the modeling image corresponding to that in the mask of the restored background image as background and removing them.

5. The input optimization method for multi-view images based on deep learning model for 3D face reconstruction according to claim 1, wherein the facial landmark algorithm model is Dlib model and a number of defined facial landmarks is 68.

6. The input optimization method for multi-view images based on deep learning model for 3D face reconstruction according to claim 1, wherein in step a), the head is further covered with a hairnet, and in step b), the first deep learning model retains the part of the hairnet without removing it.

* * * * *